Jan. 26, 1943.   F. KRAMER   2,309,513
COMBINED KITCHEN AND SERVING WAGON
Filed June 13, 1941
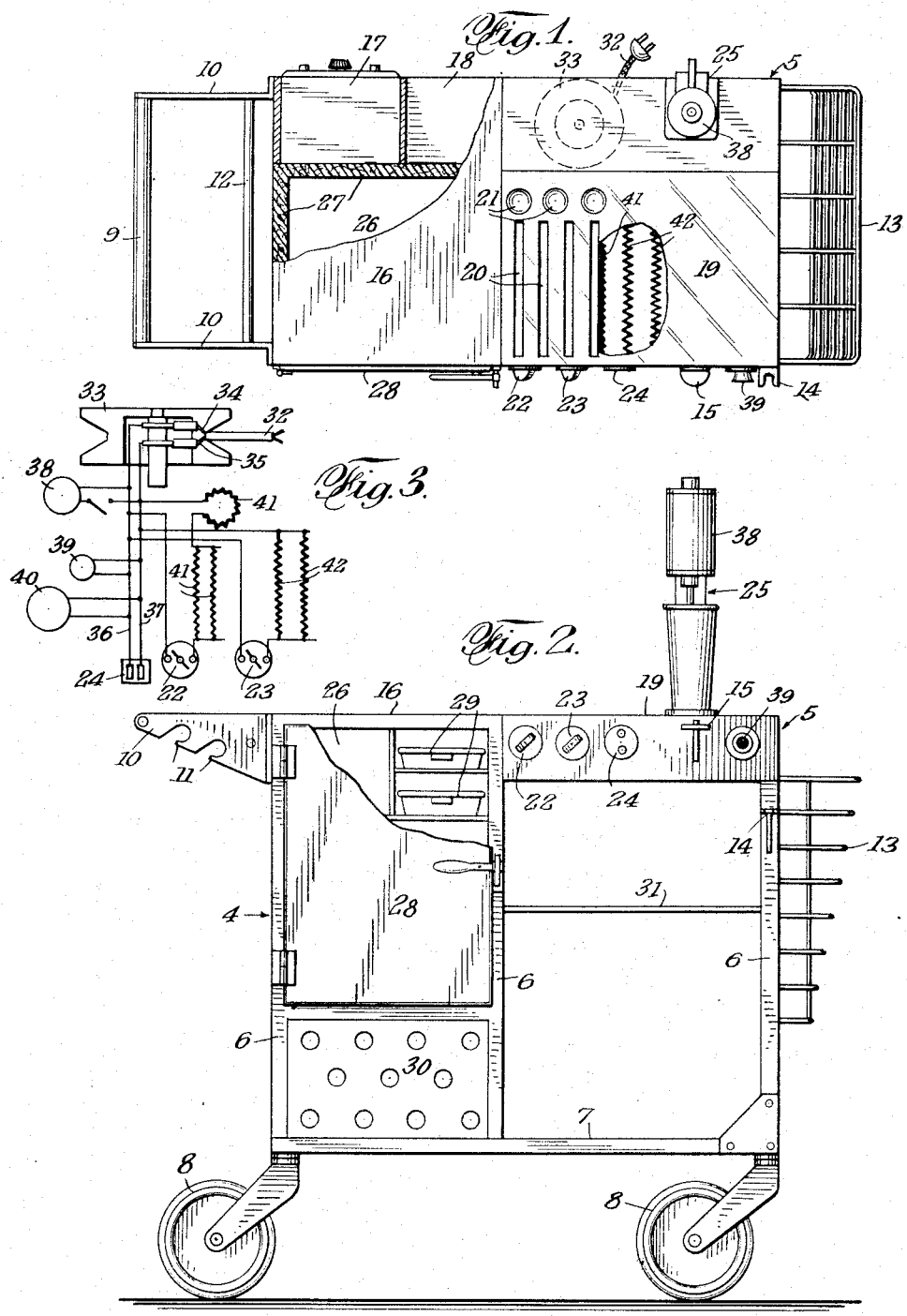
INVENTOR
FERDINAND KRAMER
BY Leon M. Strauss Patented Jan. 26, 1943

2,309,513

UNITED STATES PATENT OFFICE 2,309,513

COMBINED KITCHEN AND SERVING WAGON

Ferdinand Kramer, Port Chester, N. Y.

Application June 13, 1941, Serial No. 397,883

2 Claims. (Cl. 219—19)

This invention relates generally to combined kitchen and serving wagon and more particularly to improvements in or relating to servers for food and the like of a structure adapted to be moved from place to place for the storage, preparation and purveyance of food, drinks and the like.

The invention has for one of its objects the provision of a structure of the indicated type in which storage space for articles and food is provided; which further incorporates means for heating and cooking food; and from which food may be served as in hospitals, restaurants or various rooms in a home including porches, gardens or lawns.

The invention contemplates the provision of a novel portable structure in the nature of a tea-wagon and which incorporates those devices, machines, and instrumentalities normally found in kitchens facilitating preparing and serving of food at a point remote from a kitchen.

Structural features of the invention also form a material part of this invention whereby electric current may be obtained from a remote source to operate the various cooking and chilling devices, and other appliances incorporated in the wagon structure.

In its present form, the invention comprises a wagon provided with food and liquid storing and holding means; food and liquid cooking and refrigeration means; a serving table; liquid mixing means; and various appliances and devices essential in a kitchen.

In its broadest aspect, this invention resides further in the provision of movable carrier means, preferably in the form of a serving wagon, to which are connected, on the one hand, means for transferring electric current to any desired units for electric current consumption carried by said wagon, and an extensible cable conductor joined to a remote current source, on the other hand, whereby electric current may be distributed at said wagon to any of said electric current consuming units, such as electric appliances, which may be fixedly or removably supported by said wagon.

The foregoing and other objects and features of the invention will become more clearly apparent from the following description which refers to a preferred embodiment of the invention illustrated in the accompanying drawing. However, the embodiment herein shown and described being for the purpose of illustration only, it is to be understood that such modifications may be made when desired which are within the scope and spirit of the invention as claimed.

In the drawing:

Fig. 1 is a top plan view of a rollable combined kitchen and serving wagon incorporating the invention; parts being shown in cross-section.

Fig. 2 is a side elevational view thereof.

Fig. 3 shows diagrammatically an electrical hook-up for the various electrically operated devices incorporated in the said wagon.

Referring now more particularly to the attached drawing, there is disclosed a body 4 of the wagon provided with a top plate or part 5 supported as on legs 6 from a base 7 which also serves as a shelf usable for storing glass, china, bottles, etc. The body 4 is preferably mounted on caster wheels 8 whereby the serving wagon can easily be moved from place to place with little effort and without disturbing articles carried thereon.

The handle, whereby the device is moved, is shown at 9, said handle being mounted on the body 4 as by means of brackets 10. The latter are preferably notched to form hooks 11 which may serve to hang cutlery, such as serving knives and forks (not shown). A rod 12 may also be mounted between the brackets 10 to serve as a towel rack.

Also affixed to the body 4 and preferably at the end thereof opposite to the handle 9, a basket 13 made of wire may be provided for storing bread or other such articles. A bottle opener 14 and a can opener 15 may also be provided at an accessible portion of the body 4.

As contemplated herein, the body top 5 may be provided with a table top 16 which serves as a work or kitchen table, the rear of the top 5 being formed with an opening in which a radio 17 may be housed and with an opening 18 for storing dish towels and napkins (not shown). The table top 16 covers these openings which are accessible only from the side of the body 4.

The remainder of the top, or at least the major portion thereof, may be electrically heated as will be later described and may comprise a hot plate 19 for grilling and frying food, bread toasting cavities or pockets 20 and egg cooking pockets or recesses 21. A desired number of switches 22 and 23 may be provided for control of the heating elements of said various heating and cooking devices. Another desirable feature comprises a plug 24 which may serve as a connection for conducting current to other electrical devices such as a coffee maker, electric fan, etc. A drink mixer or juice extractor 25 may be mounted on the top 5 as shown.

Another feature of the device resides in the incorporation in the body 4 of a refrigerator 26 which is preferably formed with heat insulating walls 27 and accessible through a door 28. The refrigerator 26 may be either mechanically or electrically operated. Ample storage space is provided for food in the refrigerator which is also fitted with ice cube trays 29. The operating mechanism of the refrigerator may be housed behind the grill plate 30.

The wagon 4 may be fitted with one or more trays or shelves 31 which may be either fixed or removable as desired.

Electric current may be brought to the wagon 4 from a remote source by means of a wire cable 32 which is preferably wound upon a spring tensioned spool 33 housed in the body 4. In this manner a relatively long cable may be used and a desired length thereof unwound from the spool to a convenient outlet.

The conductors 34 and 35 may then, as by means of suitable brushes, be connected to the feed lines 36 and 37 from which all electrical connections may be made. As shown in the diagram of Fig. 3 such connections are made to the motor 38 of the mixer 25; to a cigarette lighter 39; to the operating motor 40 of the refrigerator; to the heating elements 41 of the toasting cavities and the egg cooking cavities; and to the heating elements 42 of the grill 19. As shown, the switches 22 and 23 control the two latter heating elements and if desired, switches may be incorporated for the other devices. The radio 17, of course, may also be connected as above.

It is possible, if desired, to make the table top 16 of glass or similar translucent material and to have an electric bulb or similar illuminating means positioned below the table top to bring about a certain illuminating effect, particularly when the serving wagon is used in dim light.

It is apparent that an efficient, compact and readily movable combined kitchen and serving wagon has been provided in which the purposes of the invention have been realized. Since many changes in design, arrangement and proportions may be made among the various devices and appliances, the spirit and scope of the invention as defined by the claims should not be limited by this specific disclosure which is intended as exemplary only.

Having thus described the invention what is claimed as new and desired to be secured by Letters Patent, is:

1. A serving wagon having roller means, comprising juxtapositioned compartments, a cooling unit in one of said compartments, heating means in the other of said compartments, a substantially flat table-surface-forming plate overlying both said juxtapositioned compartments, and pockets extending from said plate therebelow and adjacent said heating means, said pockets being adapted for receiving articles of food therein for direct heat treatment and being provided with openings terminating in the surface of said plate.

2. A serving wagon having roller means, comprising juxtapositioned compartments, electric cooling unit in one of said compartments, electric heating means in the other of said compartments, a substantially flat table-surface-forming plate overlying both said juxtapositioned compartments, pockets extending from said plate towards said electric heating means, said pockets being adapted to receive articles of food therein for direct heat treatment and being provided with openings terminating in the surface of said plate, and extensible cable means below said plate for conducting electric current to said heating means and said cooling unit, respectively at predetermined distance from an electric current supply source.

FERDINAND KRAMER.